US009811331B2

(12) United States Patent
Barillari et al.

(10) Patent No.: US 9,811,331 B2
(45) Date of Patent: Nov. 7, 2017

(54) COLLABORATIVE MAINTENANCE OF SOFTWARE PROGRAMS

(71) Applicant: INTERNATIONAL BUSINESS MACHINES CORPORATION, Armonk, NY (US)

(72) Inventors: Fabio Barillari, Rome (IT); Ilaria Gorga, Rome (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 14/887,818

(22) Filed: Oct. 20, 2015

(65) Prior Publication Data
US 2016/0110182 A1 Apr. 21, 2016

(30) Foreign Application Priority Data

Oct. 21, 2014 (GB) .................................. 1418706.6

(51) Int. Cl.
*G06F 9/44* (2006.01)
*G06F 9/445* (2006.01)
*G06F 11/14* (2006.01)

(52) U.S. Cl.
CPC ............ *G06F 8/65* (2013.01); *G06F 11/1433* (2013.01)

(58) Field of Classification Search
CPC ................................ G06F 8/65; G06F 11/1433
USPC ........................................................ 717/168
See application file for complete search history.

(56) References Cited

U.S. PATENT DOCUMENTS

| 5,410,703 A * | 4/1995 | Nilsson | G06F 8/67 717/168 |
| 6,314,532 B1 * | 11/2001 | Daudelin | G06F 11/1417 714/23 |
| 6,463,584 B1 * | 10/2002 | Gard | G06F 8/67 717/171 |
| 6,859,834 B1 * | 2/2005 | Arora | G06F 9/5033 709/225 |

(Continued)

OTHER PUBLICATIONS

Waddington et al. "A distributed Multimedia Component Architecture", 1997, IEEE.*

(Continued)

*Primary Examiner* — Wei Zhen
*Assistant Examiner* — Junchun Wu
(74) *Attorney, Agent, or Firm* — Jay Wahlquist

(57) ABSTRACT

Maintaining a plurality of software instances of a software program in a computing environment. An updating request is received for an updating process of the software instances from an old level to a new level. An attempt is made to update each software instance to the new level according to at least one updating policy. Responsive to a failure of the updating of each failed instance of the software instances, an exchanging instance is searched among the other software instances according to at least one searching policy, the exchanging instance being adapted to be exchanged with the failed instance for continuing the updating process according to at least one optimization criterion of the computing environment. The failed instance and the exchanging instance are exchanged in response to a positive result of the searching. The updating process corresponding to the failed instance is resumed.

11 Claims, 6 Drawing Sheets

(56) References Cited

U.S. PATENT DOCUMENTS

| | | | | |
|---|---|---|---|---|
| 7,987,459 B2* | 7/2011 | Chow | | G06F 8/65 |
| | | | | 717/168 |
| 8,639,793 B2 | 1/2014 | Kapur | | |
| 8,782,632 B1 | 7/2014 | Chigurapati et al. | | |
| 8,918,775 B1* | 12/2014 | Carpenter | | G06F 8/65 |
| | | | | 717/168 |
| 2002/0165962 A1* | 11/2002 | Alvarez | | G06F 8/65 |
| | | | | 709/226 |
| 2003/0037382 A1* | 2/2003 | Broker | | D06F 37/203 |
| | | | | 8/158 |
| 2006/0059478 A1* | 3/2006 | Krajewski, III | | H04L 29/12047 |
| | | | | 717/168 |
| 2009/0100420 A1 | 4/2009 | Sapuntzakis et al. | | |
| 2012/0233499 A1* | 9/2012 | Estaves | | G06F 9/45533 |
| | | | | 714/23 |
| 2012/0240107 A1* | 9/2012 | Brescia | | G06F 11/1433 |
| | | | | 717/168 |
| 2013/0074072 A1 | 3/2013 | Kennedy | | |
| 2013/0111562 A1* | 5/2013 | Lee | | G06F 21/6218 |
| | | | | 726/4 |
| 2013/0247022 A1 | 9/2013 | DeJana et al. | | |
| 2013/0305238 A1* | 11/2013 | Frayssignes | | G06F 8/65 |
| | | | | 717/173 |
| 2014/0019952 A1* | 1/2014 | Shamsaasef | | G06F 8/65 |
| | | | | 717/170 |
| 2014/0101648 A1 | 4/2014 | Teh et al. | | |
| 2014/0196104 A1* | 7/2014 | Chari | | H04L 63/102 |
| | | | | 726/1 |
| 2014/0282469 A1* | 9/2014 | Johnson | | G06F 8/65 |
| | | | | 717/170 |
| 2014/0309870 A1* | 10/2014 | Ricci | | H04W 48/04 |
| | | | | 701/36 |
| 2015/0286505 A1* | 10/2015 | Liu | | G06F 9/5011 |
| | | | | 718/104 |

OTHER PUBLICATIONS

Edwards et al. "Architecture-Driven Self-Adaptation and Self-Management in Robotics Systems", 2009, IEEE.*
Lutfiyya et al. "Fault Management in Distributed Systems: A Policy-Driven Approach", 2000, Journal of Network and Systems Management, vol. 8, No. 4.*
Zhou et al. "Software-Based Failure Detection and Recovery in Programmable Network Interfaces", vol. 18, No. 11, Nov. 2007, IEEE.*
GB Intellectual Property Office, Examination Report under Section 18(4)—Intention to Grant for GB Application GB1418706.6, dated Aug. 17, 2016, 1 page.
Barillari et al., "Collaborative Maintenance of Software Programs," U.S. Appl. No. 15/422,695, filed Feb. 2, 2017.
List of IBM Patents or Patent Applications Treated as Related, Signed Feb. 2, 2017, 2 pages.
Search Report for GB1418706.6 dated Apr. 30, 2015, pp. 1-5.

* cited by examiner

COLLABORATIVE MAINTENANCE OF SOFTWARE PROGRAMS

PRIOR FOREIGN APPLICATION

This application claims priority from United Kingdom (GB) patent application number 1418706.6, filed Oct. 21, 2014, which is hereby incorporated herein by reference in its entirety.

BACKGROUND

One or more aspects relate to the Information Technology (IT) field. More specifically, one or more aspects relate to the maintenance of software programs.

The background is hereinafter introduced with the discussion of techniques relating to its context. However, even when this discussion refers to documents, acts, artifacts and the like, it does not suggest or represent that the discussed techniques are part of the prior art or are common general knowledge in the field relevant to aspects of the present disclosure.

Software programs are routinely subject to maintenance operations after their delivery; this involves updating processes of the software programs for a number of reasons (for example, to correct errors or to add new functions).

The maintenance of the software programs may be quite complex, especially in large computing systems. Particularly, the maintenance of the software programs may become problematic when multiple instances of a same software program (hereinafter referred to as software instances) are available.

Indeed, during any updating process of the software instances the required updating of some of them may fail. This results in a partial updating of the software instances, with these software instances remaining at an old level (preceding the maintenance operation), while other software instances are already at a new level (enforced by the maintenance operation). The partial updating of the software instances increases a management cost thereof (because of the need of taking into account different levels of the same software program); moreover, the software instances at the old level may adversely affect the quality of a corresponding service. All of the above is exacerbated when the software programs are designed according to the Continuous Delivery (CD) practice (wherein the activities relating to their delivery are automated in a pipeline according to a lean philosophy, aimed at removing any waste that does not add value, based on Poka-Yoke mechanisms, structured to prevent human errors). The continuous delivery practice results in the ability to deliver new levels of the software programs rapidly and repeatedly; however, the corresponding higher frequency of the updating processes also increases the risk of partial updating of the software instances.

A typical example is in cloud computing (or simply cloud) environments, wherein cloud services are provided on-demand by cloud providers that provision, configure and release them upon request (completely masking a corresponding implementation); particularly, in this case, the software programs may be provided as cloud services according to the Software-as-a-Service (SaaS) model. For this purpose, a high number of software instances (of each software program) is generally required to ensure an adequate level of performance and reliability, which software instances should be kept consistently up-to-date to ensure an adequate quality of the corresponding cloud services.

SUMMARY

A simplified summary of aspects of the present disclosure is herein presented in order to provide a basic understanding thereof; however, the sole purpose of this summary is to introduce some concepts of aspects of the disclosure in a simplified form as a prelude to its following more detailed description, and it is not to be interpreted as an identification of its key elements nor as a delineation of its scope.

In general terms, aspects of the present disclosure are based on the idea of exchanging the software instances to continue their updating.

One aspect provides a method for maintaining a plurality of software instances of a software program in a computing environment, wherein in response to a failure of the updating of each failed instance thereof an exchanging instance is searched among the other software instances that is adapted to be exchanged with the failed instance for continuing the updating process according to at least one optimization criterion of the computing environment.

A further aspect provides a computer-implemented method of maintaining software instances of a software program in a computing environment. The computer-implemented method includes receiving an updating request for an updating process of a plurality of software instances from an old level to a new level; attempting to update each software instance of the plurality of software instances to the new level according to at least one updating policy; and based on a failure of the updating of a failed instance of the plurality of software instances: searching for an exchanging instance among other software instances according to at least one searching policy, the exchanging instance being adapted to be exchanged with the failed instance for continuing the updating process according to at least one optimization criterion of the computing environment; exchanging the failed instance and the exchanging instance based on a positive result of the searching; and resuming the updating process corresponding to the failed instance.

Another further aspect provides a system that performs the method as mentioned above.

BRIEF DESCRIPTION OF THE DRAWINGS

The present disclosure will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Different techniques have been proposed aiming at reducing failures during maintenance operations. For example, one technique provides the pre-testing and evaluating of potential upgrade paths to identify potential problems, and optionally to recommend one or more optimal configurations.

Moreover, the use of management policies has been proposed for updating virtual machine templates (defining and/or specifying hardware and/or software settings used repeatedly to state, create and/or instantiate virtual machines); for this purpose, a virtual machine based on a virtual machine template is started in a networked cordoned sandbox, the virtual machine is triggered to update per an updated management policy and the virtual machine is saved as an updated virtual machine template.

Techniques for versioning management have also been proposed. For example, one technique describes a failover manager that indicates which service instance version to activate to ensure that the appropriate, current version is activated for each service instance. Another technique describes creating a second virtual machine, downloading a new version of the program to the second virtual machine, maintaining a first version of the program running on a first virtual machine, and migrating from the first version of the program to the new version of program. Yet another technique describes copying a virtual machine selected for updating to an update environment leaving the original virtual machine in a virtual machine repository, thereby ensuring that the original virtual machine will not be inadvertently changed and remains available for user access.

In addition, another technique describes moving the services performed on one device to another device in a cloud computing system for a variety of reasons including failure, maintenance or upgrade of the device.

Figure 1:
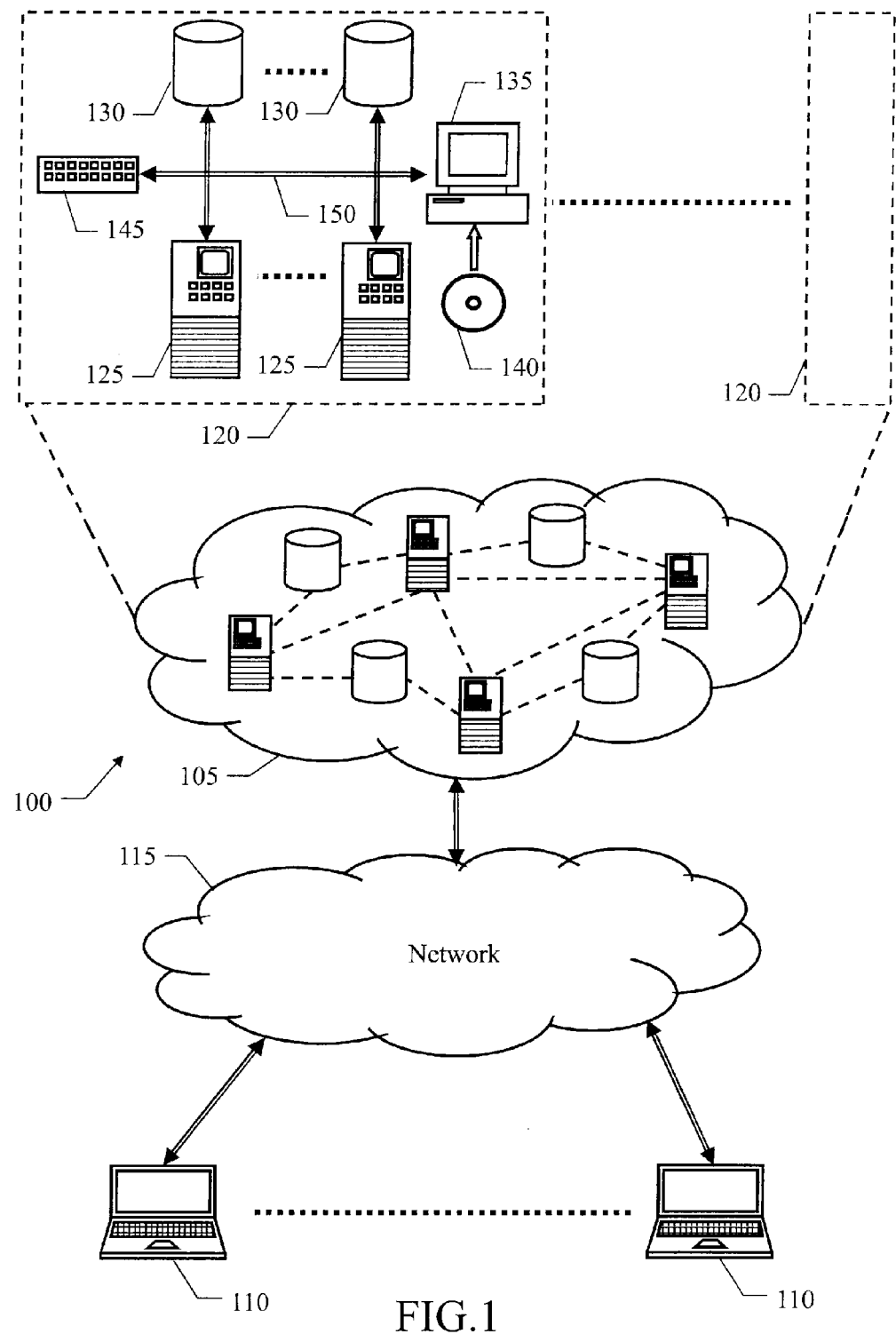
FIG. 1 shows a schematic block diagram of a system wherein a solution according to an embodiment of the present disclosure may be applied.

In accordance with one or more aspects of the present invention, with reference in particular to FIG. 1, a schematic block diagram is shown of a system 100 wherein a solution according to an embodiment of the present disclosure may be applied.

Particularly, the system 100 implements a cloud (computing) environment (providing cloud resources on demand). The cloud environment 100 may be based on different deployment models, particularly, public cloud (i.e., for the general public), private cloud (i.e., for a single organization), community cloud (i.e., for several organizations) or hybrid cloud (based on a combination of different deployment models).

The cloud environment 100 comprises one or more cloud providers 105 (only one shown in the figure). Each cloud provider 105 is an entity that provides a pool of (computing) resources as cloud services (i.e., shared resources that may be provisioned, configured and released very rapidly); the resources of the cloud services (generally of the virtual type, i.e., emulations by software of physical resources) are provided upon request to users of the cloud provider 105, so that each user has the sole control of these resources (which may then be used exactly as if they were dedicated physical resources). The cloud services may be provided according to several service models, particularly, Infrastructure as a Service, or IaaS (providing computing and storage resources with corresponding management software, such as virtual machines, virtual disks with firewalls, load balancers), Platform as a Service, or PaaS (providing software platforms, such as databases, web servers), Software As a Service, or SaaS (providing software applications, such as CADs, office suites), and Network as a Service, or NaaS (providing connectivity services, such as VPNs, IP addresses).

The users connect to the cloud provider 105 with corresponding client computing machines, or simply clients, 110 (for example, of the thin type) through a (communication) network 115; for example, the network 115 may be the Internet or a LAN (local area network) when the cloud environment 100 is a public/community cloud or a private cloud, respectively. For this purpose, the cloud provider 105 exposes a front-end component for accessing it (for example, via a web browser of the clients 110) and it has a back-end component for actually implementing its cloud resources (which back-end component is not accessible from the outside, so that the users are completely agnostic about its location and configuration). For this purpose, the cloud provider 105 owns one or more data centers 120.

Each data center 120 comprises multiple server computing machines (or simply servers) 125 and multiple storage disks 130 implementing mass-memories thereof; the data center 120 also comprises a console 135 for controlling it (for example, a personal computer, also provided with a drive for reading removable storage units, such as CD-ROMs 140). A switch/router sub-system 145 manages any communications among the servers 125, the disks 130 and the console 135, and with the network 115; for these purposes, the servers 125, the disks 130 and the console 135 are connected to the switch/router sub-system 145 through a cabling sub-system 150.

With reference now to FIG. 2A-FIG. 2F, an example application is shown of the solution according to an embodiment of the present disclosure.

Figure 2A:
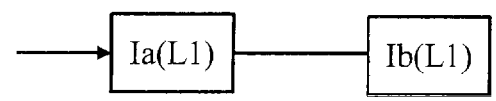
FIG. 2A-FIG. 2F show an example application of a solution according to an embodiment of the present disclosure.
Figure 2A:
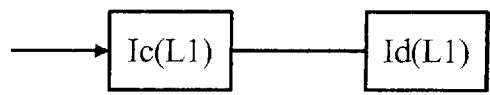

Starting from FIG. 2A, multiple (software) instances of a generic software program are available in a computing environment. For example, the software instances contribute to implement a software application that is provided according to the SaaS model; the software instances are hosted on corresponding virtual machines of a data center of the cloud provider for their users. Particularly, in the simplified scenario at issue, four software instances Ia(L1), Ib(L1), Ic(L1) and Id(L1) at a same (current) old level L1 (for example, as defined by their version, release and service pack) are available; the virtual machine of each software instance Ia(L1)-Id(L1) also mounts a virtual disk of the same data center (not shown in the figure), which stores corresponding data.

The software instances Ia(L1)-Id(L1) may have different roles. For example, the software instances Ia(L1) and Ic(L1), referred to as primary instances and indicated by corresponding arrows pointing to them, may have a primary role when they are operative, i.e., actually used by one or more corresponding users; the software instances Ib(L1) and Id(L1), referred to as secondary instances, may instead have a secondary role where they are simply available as a back-up of the primary instances Ia(L1) and Ic(L1), respectively, as indicated by a corresponding line linking them in pairs.

An updating request is received for an updating process of the software instances Ia(L1)-Id(L1) to a new level L2 (for example, to change their version/release or to apply a service pack or individual patches). In response thereto, an attempt is made to update the software instances Ia(L1)-Id(L1) to the new level L2 according to one or more updating policies; for example, the updating policies may involve in succession updating the secondary software instances, swapping the roles of the software instances (so that the secondary instances become the primary instances and vice-versa), updating the current secondary instances (i.e., the original primary instances) and then swapping back the roles of the software instances (so as to return to the original primary instances and secondary instances).

Figure 2B:
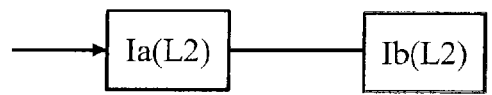
Figure 2B:
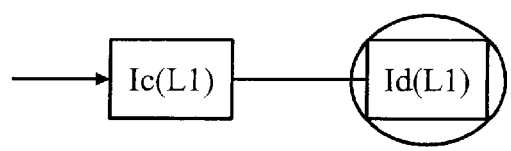

Moving to FIG. 2B, in the example at issue the updating of the pair of software instances Ia(L1), Ib(L1) completes successfully, after updating the secondary software instance Ib(L1) to the new level L2 (i.e., Ib(L2)), swapping the roles of the software instances Ia(L1), Ib(L2) (to have the primary instance Ib(L2) and the secondary instance Ia(L1)), updating the current secondary instance Ia(L1) to the new level L2 (i.e., Ia(L2)) and then swapping back the roles of the software instances (to have the primary instance Ia(L2) and the secondary instance Ib(L2) at the new level L2 as desired). Conversely, the updating of the other pair of software instances Ic(L1), Id(L1) fails (for example, because of network communication problems, coding errors); particularly, the updating to the new level L2 of the secondary instance Id(L1), referred to as a failed instance and indicated by a circle, fails so that it remains at the old level L1.

In a solution according to an embodiment of the present disclosure, in response thereto an exchanging instance is searched among the other software instances Ia(L2), Ib(L2), Ic(L1) according to one or more searching policies; for example, the searching policies limit the searching in the same data center where the failed instance Id(L1) is hosted. The exchanging instance should be adapted to be exchanged with the failed instance Id(L1) for continuing the updating process according to an optimization criterion (or more) of the computing environment; for example, the optimization criterion may be a maximum number of primary instances at the new level L2.

In the example at issue, the result of the searching is positive, since the exchanging instance is found in the secondary instance Ib(L2). Indeed, in this case the corresponding primary instance Ia(L2) is already at the new level L2, so that any exchange of the secondary instance Ib(L2) is immaterial to the number of primary instances at the new level L2; therefore, the failed instance Id(L1) and the exchanging instance Ib(L2) may be exchanged between them, so as to allow continuing the updating process in order to increase the number of the primary instances at the new level L2.

Figure 2C:
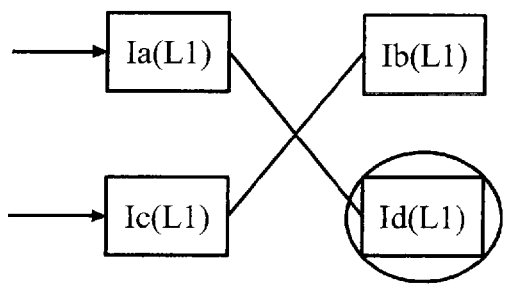

Moving to FIG. 2C, as a result, the failed instance Id(L1) becomes the secondary instance of the primary instance Ia(L2) and the exchanging instance Ib(L2) becomes the secondary instance of the primary instance Ic(L1).

Figure 2D:
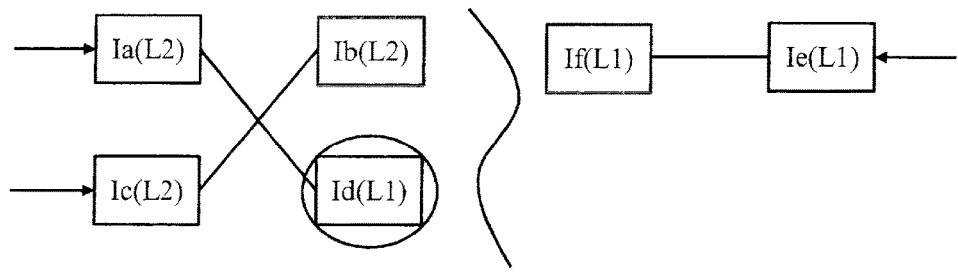

Moving to FIG. 2D, the updating process corresponding to the failed instance Id(L1), now the exchanging instance Ib(L2), is resumed. Particularly, the roles of the software instances Ic(L1), Ib(L2) are swapped (to have the primary instance Ib(L2) and the secondary instance Ic(L1)), the current secondary instance Ic(L1) is updated to the new level L2 (i.e., Ic(L2)) and then the roles of the software instances are swapped back; therefore, assuming that all these operations complete successfully, there is obtained the primary instance Ic(L2) and the secondary instance Ib(L2) at the new level L2 as desired.

As a result, both the primary instances Ia(L2) and Ic(L2) are now at the new level L2 (so as to maximize their number as required by the optimization criterion), despite the failed instance Id(L1).

In this way, it is possible to reduce (down to avoid at all) any partial updating of the software instances due to any failure of the updating thereof; this result is achieved in a collaborative way by exploiting the existing software instances (with limited overhead of the computing environment). The above-described technique reduces the management costs of the software instances (because the number of different levels of the same software programs is lower, down to a single one). Moreover, this has a beneficial effect on the quality of the corresponding (cloud) services; particularly, it is possible to reduce the Time to Value (TtV), between any request of the users and the corresponding updating of their software instances, thereby allowing responding more promptly to any needs thereof. These advantages are particularly evident when the software programs are designed according to the continuous delivery practice, wherein their new levels may be delivered rapidly and repeatedly.

The same operations described above are then reiterated; however, no further exchanging instance may now be found for the failed instance Id(L1) that allows continuing the updating process. Therefore, the updating process ends with the failed instance Id(L1) at the old level L1 (i.e., with a partial updating).

In a specific implementation, in response thereto a (further) exchanging instance is (further) searched that is adapted to be exchanged with each failed instance (i.e., Id(L1) in the example at issue) for continuing the updating process; the exchanging instance is now searched according to one or more expanding policies that expand the searching policies. For example, the expanding policies may expand the search of the exchanging instance to every other data center of the cloud provider. In the scenario at issue, this comprises a further pair formed by a primary instance Ie(L1) and a secondary instance If(L1) of the same software program at the old level L1 in another data center (for other users); in this case, the updating to the new level L2 does not apply to the software instances Ie(L1), If(L1) (for example, because their users prefer a more stable level of the software program).

The result of the searching is now positive, since the exchanging instance is found in the secondary instance If(L1). Indeed, in this case the old level of the failed instance Id(L1) is acceptable by the other users of the software instances Ie(L1), If(L1); therefore, the failed instance Id(L1) and the exchanging instance If(L1) may be exchanged between them, so as to allow continuing the updating process.

Figure 2E:
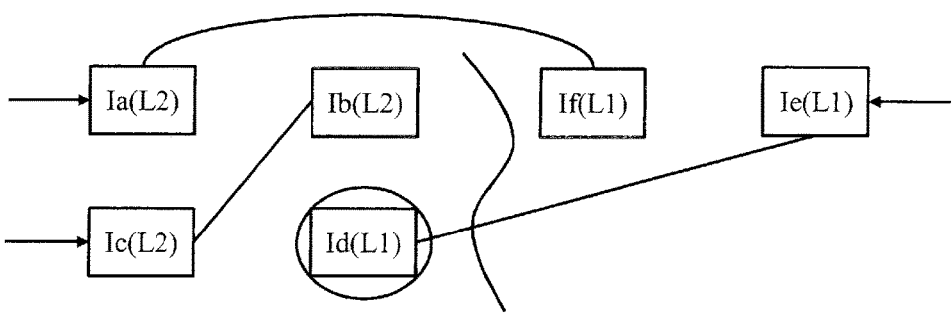

Moving to FIG. 2E, as a result, the failed instance Id(L1) becomes the secondary instance of the primary instance Ie(L1) and the exchanging instance If(L1) becomes the secondary instance of the primary instance Ia(L2).

Figure 2F:
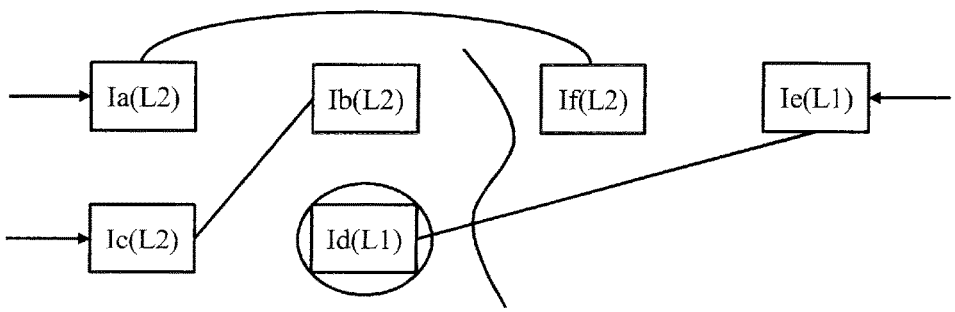

Moving to FIG. 2F, the updating process corresponding to the failed instance Id(1), now the exchanging instance If(L1), is resumed. Particularly, the secondary instance If(L1) is updated to the new level L2 (i.e., If(L2)); therefore, assuming that this updating is successful, there is obtained the primary instance Ia(L2) and the secondary instance If(L2) at the new level L2 as desired.

As a result, all the software instances Ia(L2), If(L2), Ic(L2) and Ib(L2) are now at the new level L2 as required by the corresponding users (without any effect on the old level L1 of the software instances Ie(L1) and Id(L1) instead required by the other users).

This further reduces (down to avoiding at all) any partial updating of the software instances due to the failure of any updating thereof (thereby incrementing the above-mentioned advantages).

Particularly, this result may be achieved leveraging a global collaborative approach (among different computing environments); for example, in this way it is possible to re-organize different data centers to comply dynamically with changing requirements.

Figure 3:
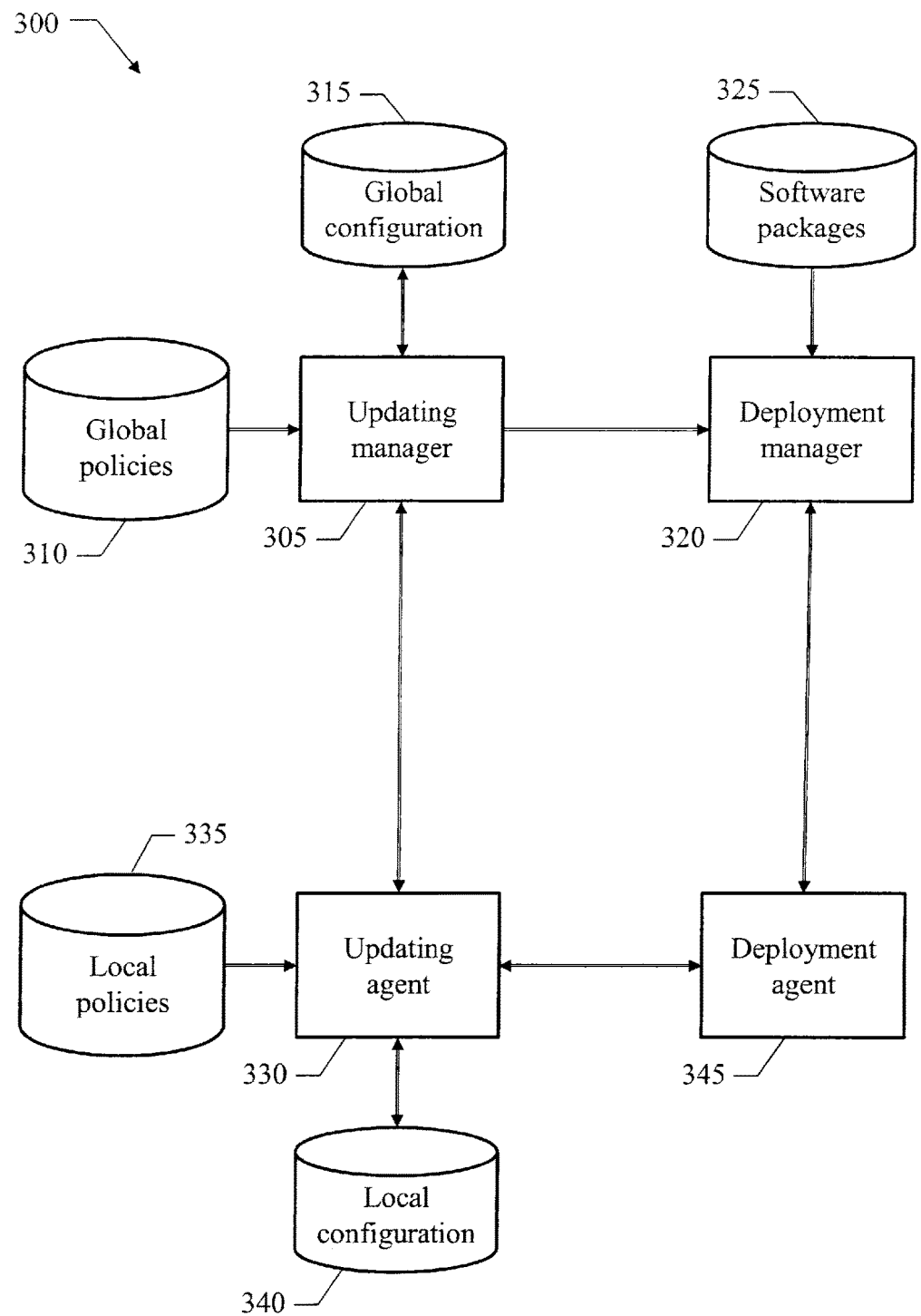
FIG. 3 shows software components that may be used to implement a solution according to an embodiment of the present disclosure.

With reference now to FIG. 3, software components are shown that may be used to implement a solution according to an embodiment of the present disclosure.

All the software components (programs and data) are denoted as a whole with the reference 300. The software components 300 are typically stored in the mass memory and loaded (at least partially) into the working memory of corresponding computing machines when the programs are running. The programs are initially installed into the mass memory, for example, from removable storage units or from the network. In this respect, each software component may represent a module, segment or portion of code, which comprises one or more executable instructions for implementing the specified logical function.

Particularly, in each data center (only one shown in the figure) an updating manager 305 (for example, hosted on a dedicated virtual machine thereof) controls the updating of all the software instances of the data center. For this purpose, the updating manager 305 accesses a global policy repository 310 that stores global policies for the entire data center. Particularly, the global policy repository 310 stores a global updating policy (or more), a global searching policy (or more) and a global expanding policy (or more); for example, as above the global updating policy may involve, in succession, updating the secondary software instances, swapping the roles of the software instances, updating the current secondary instances and then swapping back the roles of the software instances; the global searching policy may limit the search to the same data center; and the global expanding policy may expand the search to all the other data centers of the cloud provider. The global policies allow controlling the updating process centrally. Moreover, the updating manager 305 controls a global configuration repository 315 that stores global configuration information of the data center. Particularly, the global configuration information comprises an indication of the users of each pair of software instances, their current roles and levels; the global configuration information further comprises an optimization criterion of the data center (for example, maximum number of primary instances at the new level as above).

The updating manager 305 communicates with a deployment manager 320 (for example, hosted on another dedicated virtual machine of the same or of a different data center) that controls the deployment of every new level of the software instances. For this purpose, the deployment manager 320 accesses a software package repository 325 that stores a software package for each supported level of each software program; the software package comprises all the artifacts that are required to enforce the desired level of the software program (such as an image thereof and corresponding commands).

An updating agent 330 associated with each software instance (for example, hosted on the same virtual machine thereof) controls its updating. For this purpose, the updating agent 330 accesses a local policy repository 335 that stores local policies specific for the software instance. Particularly, the local policy repository 335 stores a local updating policy (or more), a local searching policy (or more) and a local expanding policy (or more); for example, the local updating policy may limit the updating to the new level to the primary instances only (with the secondary instances that instead remain at the old level); the local searching policy may limit the searching to the same server wherein the failed instance is hosted; and the local expanding policy may expand the searching to the other data centers of the cloud provider in a same geographical area only (such as region, state). The local (updating, searching and expanding) policies supersede the corresponding global policies. Therefore, with reference to the above-mentioned examples, a resulting (total) updating policy will be updating the secondary software instances and swapping the roles of the software instances. For example, with reference again to the pair of primary software instance Ia(L1) and secondary software instance Ib(L1) at the old level L1, an updating process thereof to the new level L2 now involves updating the secondary software instance Ib(L1) to the new level L2 (i.e., Ib(L2)) and swapping the roles of the software instances Ia(L1), Ib(L2) (to have the primary instance Ib(L2) and the secondary instance Ia(L1) as desired); a further updating process of the same software instances Ia(L2), Ib(L1) to a further new level L3 then involves updating the secondary software instance Ia(L1) to the new level L3 (i.e., Ia(L3)) and swapping the roles of the software instances Ia(L3), Ib(L2) (to have the primary instance Ia(L3) and the secondary instance Ib(L2) as desired), and so on. Moreover, with reference again to the above-mentioned examples, a resulting (total) searching policy will be in the same server, and a resulting (total) expanding policy will be in the other data centers in the same geographical area. This allows controlling the updating process of the software instances individually; as a result, it is possible to cope with specific requirements of the corresponding users (for example, when they have different reliability/performance requirements). Moreover, the updating agent 330 controls a local configuration repository 340 that stores local configuration information of the corresponding software instance; particularly, the local configuration information comprises an indication of the software program of the corresponding software instance, its role and the other software instance of the pair.

The updating agent 330 communicates with the updating manager 305 and with the updating agents of other software instances (not shown in the figure) for controlling the updating of its software instance. The updating agent 330 also interacts with an associated deployment agent 345 (for example, hosted on the same virtual machine); the deployment agent 345 communicates with the deployment manager 320 for controlling the downloading and the application of each required software package, in order to update the corresponding software instance to its level.

Figure 4A:
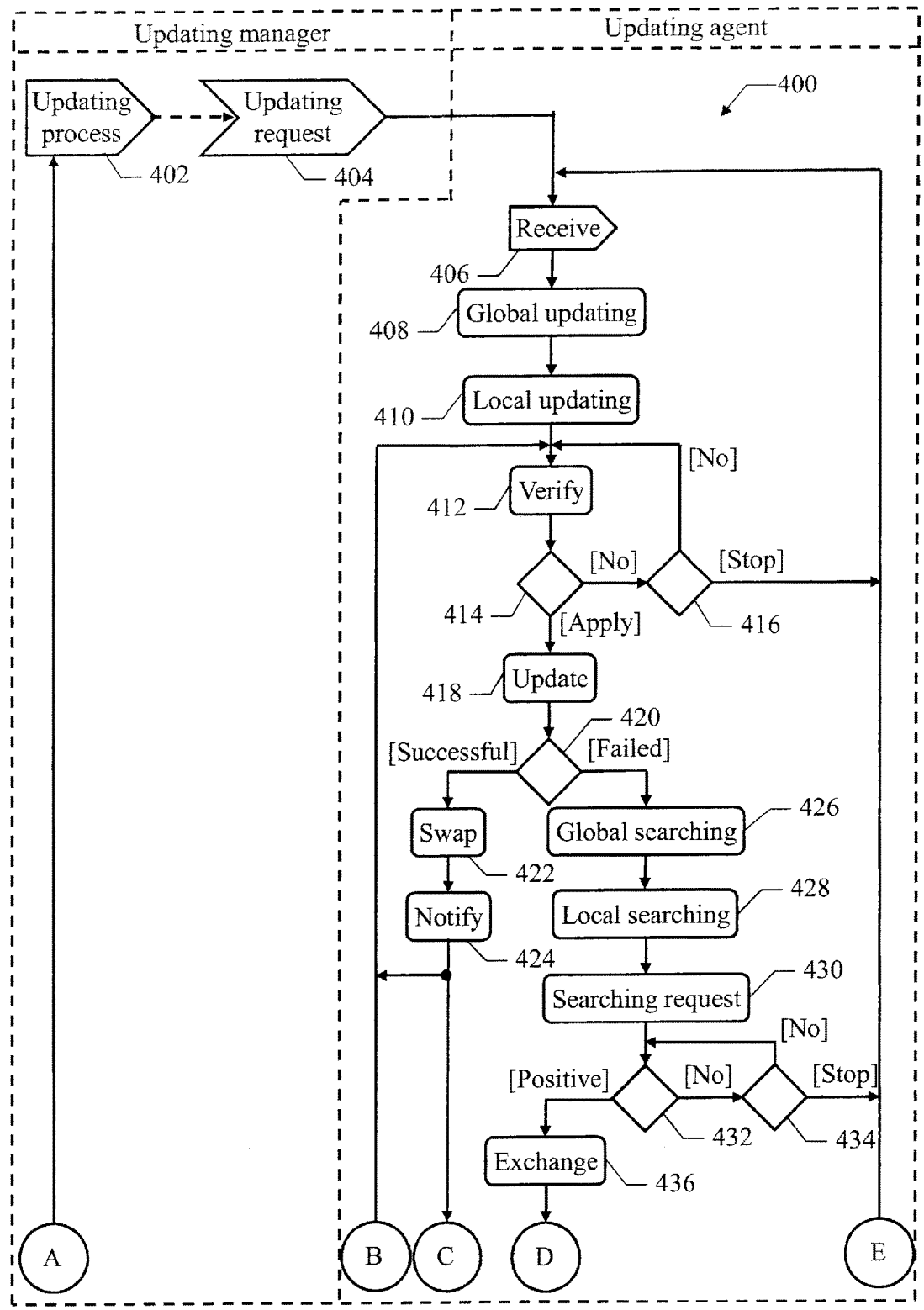
FIG. 4A-FIG. 4B show an activity diagram describing a flow of activities relating to an implementation of a solution according to an embodiment of the present disclosure.
Figure 4B:
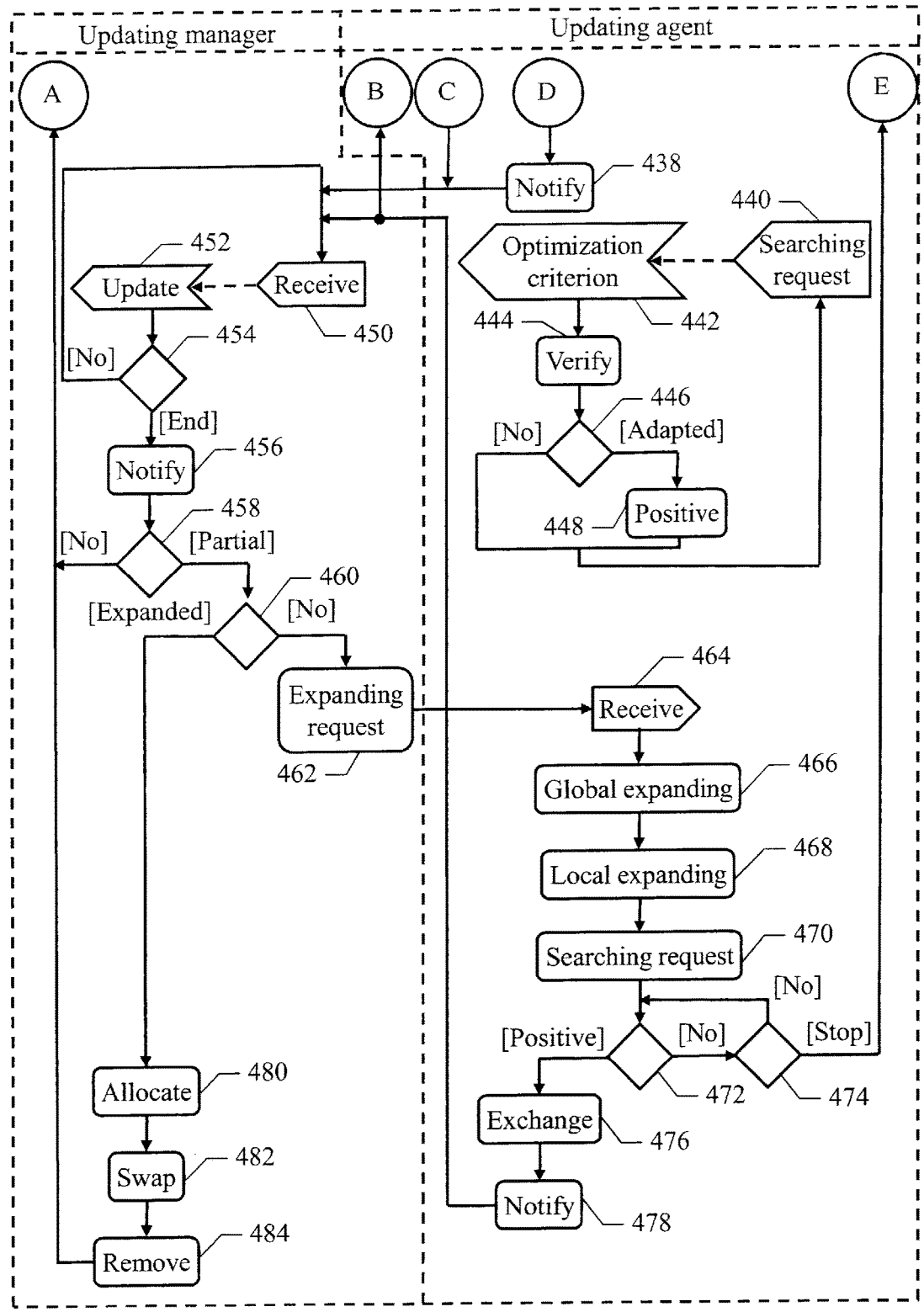

With reference now to FIG. 4A-FIG. 4B, an activity diagram is shown describing a flow of activities relating to an implementation of a solution according to an embodiment of the present disclosure.

Particularly, the diagram represents an example updating process with a method 400. In this respect, each block may represent one or more executable instructions for implementing the specified logical function on the relevant computing machine.

With reference to the swim-lane of the updating manager of a generic data center, the process passes from block 402 to block 404 whenever an updating process of its software instances is required (for example, in response to a corresponding command submitted by a system administrator thereof). In response thereto, a corresponding updating request is built and broadcast to all the updating agents of the data center. The updating request comprises an indication of the software program to be updated and its new level; the updating request may further comprise an indication of the global updating policy, of the global searching policy and of the optimization criterion.

Moving to the swim-lane of a generic updating agent, it is listening at block 406 for any updating request. As soon as an updating request is received, the process passes to block 408 wherein the global updating policy is extracted from the updating request (if comprised therein, or it is downloaded from the updating manager otherwise). Continuing to block 410, the local updating policy is retrieved from the corresponding repository (if available). With reference now to block 412, a verification is made to determine whether the updating process applies to the corresponding software instance according to the global updating policy possibly superseded by the local updating policy. This verification is based on the corresponding software program (retrieved from the local configuration information) with respect to the one to be updated (extracted from the updating request), on the current level of the software instance (retrieved from the local configuration information) with respect to the new level (extracted from the updating request), on the role of the software instance (retrieved from the local configuration information) and on the current level of the other software instance of the pair (received from the corresponding updating agent as indicated in the local configuration information) with respect to the new level. For example, in case of only the above-mentioned global updating policy (i.e., updating the secondary software instances, swapping the roles of the software instances, updating the current secondary instances and then swapping back the roles of the software instances) the updating process applies when the software instance (of the software program to be updated) has the secondary role and it is not at the new level. Instead, in case of the above-mentioned local updating policy too (i.e., primary instances at the new level and secondary instances at the old level) resulting in the above-mentioned total updating policy (i.e., updating the secondary software instances and swapping the roles of the software instances) the updating process applies when the software instance (of the software program to be updated) has the secondary role, it is not at the new level and the corresponding primary instance is not at the new level as well. The flow of activity then branches at block 414 according to a result of this verification. Particularly, if the updating process does not apply to the software instance, a further test is made at block 416 to verify whether the above-described operations have to be stopped. The stop applies when no updating is required to the software instance according to the global updating policy possibly superseded by the local updating policy; for example, again in the case of only the above-mentioned global updating policy this happens when the software instance is at the new level, whereas in the case of the above-mentioned local updating policy too this happens when the software instance has the primary role and it is at the new level or when the software instance has the secondary role and the corresponding primary instance is at the new level. Moreover, the stop applies when a notification of the end of the updating process has been received from the updating manager (as described in the following), or after a predefined time-out. If the stop does not apply, the flow of activity returns to the block 412 to reiterate the verification of the applicability of the updating process to the software instance. Conversely, as soon as the stop applies, the flow of activity returns to the block 406 waiting for a next updating request.

Referring back to the block 414, as soon as the updating process applies to the software instance the flow of activity descends into block 418. At this point, an attempt is made to update the software instance to the new level (by downloading the corresponding software package and applying it). The process branches at block 420 according to a result of the updating of the software instance. If the updating of the software instance has been successful, the roles of the software instance and of the other software instance of the pair are swapped at block 422, if it is necessary (by sending a corresponding message to the updating agent of the other software instance). A notification of the updating of the software instance is then returned to the updating manager at block 424.

In this way, the control of the flow of the updating process is distributed throughout the updating agents of all the software instances (thereby reducing a workload of the updating manager).

With reference again to the block 420, if the updating of the software instance has failed (failed instance) the process passes to block 426 wherein the global searching policy is extracted from the updating request (if comprised therein, or it is downloaded from the updating manager otherwise). Continuing to block 428, the local searching policy is retrieved from the corresponding repository (if available). A corresponding searching request is then built and broadcast at block 430. The searching request comprises an indication of the software program to be updated and of its new level; the searching request may further comprise an indication of the optimization criterion (extracted from the updating request). The searching request is broadcast sent to other updating agents selected according to the global searching policy possibly superseded by the local searching policy (for example, in the same data center or in the same server). A test is made at block 432 to verify whether a positive response to the searching request has been received from one of the (selected) other updating agents. If not, a further test is made at block 434 to verify whether the above-described operations have to be stopped; the stop applies when the notification of the end of the updating process has been received from the updating manager, or after a predefined time-out. If the stop does not apply, the flow of activity returns to the block 432 to reiterate the verification of the receipt of a positive response to the searching request. Conversely, as soon as the stop applies, the flow of activity returns to the block 406 waiting for a next updating request.

Referring back to the block 432, as soon as a positive response to the searching request has been received the flow of activity descends into block 436; at this point, the corresponding software instance is selected as the exchanging instance, and it is exchanged with the failed instance (after completing a handshaking process and putting them offline). A notification of the exchanging is then sent to the updating manager at block 438 (FIG. 4B) (with the two software instances that may exchange the mounting of their virtual disks storing the corresponding data and return online after a confirmation of the swapping of their users from the updating manager). At the same time, the flow of activity returns to the block 412 to reiterate the verification of the applicability of the updating process to the software instance (so exchanged).

In a completely independent way, the updating agent is listening at block 440 for any searching request from every other updating agent. As soon as a searching request is received, the process passes to block 442 wherein the optimization criterion is extracted from the searching request (if comprised therein, or it is downloaded from the updating manager otherwise). With reference now to block 444, a verification is made to determine whether the software instance is adapted to be exchanged with the failed instance (of the updating agent from which the searching request has been received) according to the optimization criterion. This verification is based on the corresponding software program (retrieved from the local configuration information) with respect to the one of the failed instance (extracted from the searching request) and on a progress of its updating (retrieved from the local configuration information) with respect to the new level (extracted from the searching request). For example, in case of the above-mentioned optimization criterion (i.e., maximum number of primary instances at the new level), the software instance is adapted to be exchanged with the failed instance when it has the secondary role, its updating has not failed and the corresponding primary instance is at the new level. The flow of activity then branches at block 446 according to a result of this verification. Particularly, if the software instance is adapted to be exchanged with the failed instance, a corresponding positive response to the searching request is built and returned to the updating agent from which it has been received at block 448. The process then returns to the block 440 waiting for a next searching request; the same point is also reached directly from the block 446 when the software instance is not adapted to be exchanged with the failed instance.

Referring back to the swim-lane of the updating manager, it is listening at block 450 for any notification from all the updating agents relating to the updating of their software instances. As soon as a notification is received, the process passes to block 452 wherein the global configuration information is updated accordingly. A test is then made at block 454 to verify whether the updating process has ended; this happens when the updating of all the software instances has been successful (resulting in a complete updating thereof), when the updating of one or more software instances has failed and no exchanging instance may be found for them (resulting in a partial updating of the software instances), or in any case after a predefined time-out. If the updating process has not ended yet, the process returns to the block 450 waiting for a next notification relating thereto. Conversely, as soon as the updating process has ended, this is notified to all the updating agents at block 456. The flow of activity then branches at block 458 according to how the updating process has ended. If the updating process has been complete, the flow of activity returns to the block 402 waiting for a next updating request. Conversely, when the updating process has been partial, a test is made at block 460 to verify whether the searching of the exchanging instances has already been expanded. If not, an expanding request is built and broadcast at block 462. The expanding request comprises an indication of the software program to be updated and of its new level; the expanding request may further comprise an indication of the global expanding policy. The expanding request is sent to the updating agent of each failed instance.

Moving to the swim-lane of the updating agent, it is listening at block 464 for any expanding request. As soon as an expanding request is received, the process passes to block 466 wherein the global expanding policy is extracted from the expanding request (if comprised thereon, or it is downloaded from the updating manager otherwise). Continuing to block 468, the local expanding policy is retrieved from the corresponding repository (if available). A corresponding (further) searching request is then built and broadcast at block 470. The searching request comprises an indication of the software program to be updated and of its new level. The searching request is sent to (further) other updating agents selected according to the global expanding policy possibly superseded by the local expanding policy (for example, to all the data centers of the cloud provider or only in the same geographical area). A test is made at block 472 to verify whether a positive response to the searching request has been received from one of the (selected) other updating agents. If not, a further test is made at block 474 to verify whether the above-described operations have to be stopped; the stop applies when a further notification of the end of the updating process has been received from the updating manager, or after a predefined time-out. If the stop does not apply, the flow of activity returns to the block 472 to reiterate the verification of the receipt of a positive response to the searching request. Conversely, as soon as the stop applies, the flow of activity returns to the block 406 without performing any further action.

Referring back to the block 472, as soon as a positive request to the searching request has been received the flow of activity descends into block 476; at this point, the corresponding software instance is selected as the (further) exchanging instance, and it is exchanged with the failed instance as above. A notification of the exchanging is then sent to the updating manager at block 478 (for its receiving at the block 450, with the two software instances that may then complete their exchange as above). At the same time, the flow of activity returns to the block 412 to reiterate the verification of the applicability of the updating process to the software instance (as exchanged).

Referring back to the block 460 in the swim-lane of the updating manager, if the searching of the exchanging instances has already been expanded (but the updating process remains partial) the process descends into block 480. At this point, for each failed instance a new virtual machine is allocated and a new instance of the software program directly at the new level (referred to as new instance) is installed thereon. Continuing to block 482 (assuming that the above-described operations complete successfully), each failed instance is put offline, the corresponding users are swapped to the corresponding new instance and the latter is put online. The virtual machine of each failed instance (now unused) is discarded at block 484 (thereby recovering corresponding resources). The process then returns to the block 402 waiting for a next updating process.

Naturally, in order to satisfy local and specific requirements, a person skilled in the art may apply many logical and/or physical modifications and alterations to aspects of the present disclosure. More specifically, although aspects of this disclosure have been described with a certain degree of particularity with reference to one or more embodiments thereof, it should be understood that various omissions, substitutions and changes in the form and details as well as other embodiments are possible. Particularly, different embodiments of aspects of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for maintaining a plurality of software instances of a software program in a computing environment. The method comprises the following. An updating request is received for an updating process of the software instances from an old level to a new level. The method involves attempting to update each software instance to the new level according to at least one updating policy. The following are performed in response to a failure of the updating of each failed instance of the software instances. An exchanging instance is searched among the other software instances according to at least one searching policy; the exchanging instance is adapted to be exchanged with the failed instance for continuing the updating process according to at least one optimization criterion of the computing environment. The failed instance and the exchanging instance are exchanged in response to a positive result of the searching. The updating process corresponding to the failed instance is resumed.

However, the software program may be of any type (for example, an operating system, a middleware program) and with any number of software instances; the software instances may be provided in any way (for example, on dedicated partitions, on corresponding servers or clients) and in any computing environment (for example, a LAN). The updating request may be received in any way (for example, according to a central control thereof based on a corresponding plan that schedules different phases of the updating process in succession). The updating of the software instances may be of any type (for example, for modifying existing functions, improving performance, copying with changes in their execution environments, removing obsolete functions), and from any old level to any new level (for example, a downgrading). The updating policies may be in any number and of any type (for example, limiting the updating to selected software instances only, such as for premium users). The exchanging instance may be searched in any way; for example, the exchanging instance may be simply the first one that is found as described above, or it may be selected according to one or more additional criteria (for example, depending on its distance from the failed instance as measured by any metrics, such as based on a corresponding transmission time). The searching policies may be in any number and of any type (for example, in a same LAN). The optimization criteria may be in any number and of any type (for example, maximizing the number of users provided with the new level of the software program). The failed instance and the exchanging instance may be exchanged between them in any way (for example, by applying corresponding configurations, moving corresponding data). The updating process may be resumed in any way (see below).

In an embodiment, each software instance has at least one of a plurality of roles; the at least one updating policy and/or the at least one optimization criterion depend on the roles of the software instances.

However, the roles may be in any number (down to a single one) and of any type (see below), and each software instance may have any number of them (down to none). The updating policies only, the optimization criteria only or both of them may depend on the roles of the software instances in any way (for example, with an updating policy causing the updating to the new level of the secondary instances after a predefined period of use without any problem of the primary instances at the new level, with an optimization criterion for maximizing the number of secondary instances at the old level). In any case, different updating policies and optimization criteria independent of the roles of the software instances are feasible (for example, an updating policy causing the updating of all the software instances indiscriminately, an optimization criterion minimizing a downtime of the software instances).

In an embodiment, the at least one optimization criterion comprises an optimization criterion for maximizing an optimization value depending on a number of the software instances, having at least a selected one of the roles, at the new level.

However, the optimization value may depend on the number of the software instances in any way (for example, weighted according to the computing power of their virtual machines); moreover, the optimization value may relate to any number and type of roles (for example, maximum number of software instances at the new level for mission critical applications, for premium users).

In an embodiment, the roles comprise a primary role for each software instance being operative and a secondary role for each software instance being a back-up of one or more associated software instances having the primary role.

However, any number of software instances of the secondary role may be associated with any number of software instances having the primary role (for example, one or more for all the users of a specific location). In any case, the software instances may have different, additional or alternative roles (for example, for hot/warm/cold recovery, for test purposes).

In an embodiment, for each failed instance the searching an exchanging instance comprises the following operations. An exchanging request is broadcast for each one of the other software instances. A positive response to the exchanging request is received for each one of the other software instances that is adapted to be exchanged with the failed instance; the exchanging instance is selected among the other software instances for which the positive response has been received. Moreover, for each software instance the method further comprises the following. The exchanging request is received for each failed instance. The method involves verifying whether the software instance is adapted to be exchanged with the corresponding failed instance in response to the exchanging request. The positive response is returned to the exchanging request when the software instance is adapted to be exchanged with the corresponding failed instance.

However, the exchanging request and the corresponding response may be managed in any way (for example, by returning a negative or positive response in any case). The exchanging instance may be selected (among the other software instances for which the positive response has been received) in any way (see above). In any case, the exchanging instance may be searched in a different way (for example, centrally according to the global configuration information).

In an embodiment, the exchanging instance is at the old level; the resuming the updating process corresponding to the failed instance comprises attempting to update the exchanging instance to the new level.

In an embodiment, the exchanging instance is at the new level; the resuming the updating process corresponding to the failed instance comprises enabling the updating to the new level of at least a next one of the software instances being conditioned on the updating of the failed instance.

However, the exchanging instance may be of any type (for example, only at the new level) and the updating process may be resumed in any way (for example, enabling the updating of any number of next software instances), down to simply completing it without any further operation.

In an embodiment, the method further comprises the following for each failed instance that remains at an end of the updating process. An expanding request for expanding the searching is received. The method involves further searching a further exchanging instance (adapted to be exchanged with the failed instance for continuing the updating process) according to at least one expanding policy expanding the searching policy. The failed instance and the further exchanging instance are exchanged in response to a positive result of the further searching. The updating process corresponding to the failed instance is resumed.

However, the expanding policies may be in any number and of any type (see below), with these additional steps that may be performed in any way as above. In any case, the searching may be expanded at any time (for example, directly after a negative result thereof) or even never (with or without the possibility of allocating brand new software instances for the failed instances).

In an embodiment, the at least one expanding policy comprises an expanding policy for searching the further exchanging instance in at least one further computing environment that comprises a plurality of further instances of the software program.

However, the further computing environments may be in any number and of any type (for example, other data centers of a corresponding community). In any case, different, additional or alternative expanding policies are feasible, even in the same computing environment (for example, expanding the searching of the exchanging instance to software instances of premium users being excluded in the previous searching).

In an embodiment, the at least one updating policy comprises at least one global updating policy, the at least one searching policy comprises at least one global searching policy and/or the at least one expanding policy comprises at least one global expanding policy for all the software instances of the computing environment.

However, the global (updating, searching, expanding) policies may be of any type (see above) and in any number (down to none).

In an embodiment, the software instances are partitioned in a plurality of instance groups each one comprising at least one of the software instances. The at least one updating policy comprises at least one local updating policy, the at least one searching policy comprises at least one local searching policy and/or the at least one expanding policy comprises at least one local expanding policy for each instance group that supersede the at least one global updating policy, the at least one global searching policy and the at least one global expanding policy, respectively.

However, the software instances may be partitioned in any number and type of instance groups, each one comprising any number of software instances (for example, for a same department, location, company, user). The local (updating, searching, expanding) policies may be of any type (see above) and in any number (down to none).

More generally, the (updating, searching, expanding) policies may be defined only globally for all the software instances, only individually for each software instance, only collectively for each instance group or in any combination thereof, with the policies at the different levels that may be combined in any way (for example, cumulatively).

In an embodiment, each software instance is provided according to a software as a service model in a cloud environment.

However, the cloud environment may be of any type (for example, free of charge or on a pay-per-use basis), and the software instances may be provided in any way (for example, as part of a service provided according to the IaaS, PaaS or NaaS model). In any case, the same method may be implemented in any other environment (for example, a traditional client/server environment).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program, which is configured for causing a computing system to perform the steps of the above-described method. A further embodiment provides a computer program product comprising a non-transitory computer readable medium embodying a computer program, which computer program is loadable into a working memory of a computing system thereby configuring the computing system to perform the same method.

However, the computer program may be implemented as a stand-alone module, as a plug-in for a pre-existing software program (for example, a deployment agent or a cloud manager), or even directly in the latter. More generally, the operations described above may be performed all locally, all centrally or in a combination thereof; for example, it is possible to move the searching of the exchanging instance (in part or entirely) to the updating manager (even without the need of any updating agent).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the same method.

However, the method may be performed on any system. The system may be based on a different architecture (for example, a local, wide area, global, cellular or satellite network), and it may exploit any type of (wired and/or wireless) connections. However, an implementation of the method on a stand-alone computer is not excluded. In any case, each computing machine used to implement the method may have another structure or may comprise similar elements; moreover, it is possible to replace the computing machine with any code execution entity, based on either a physical machine or a virtual machine or any combination thereof.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed is:

1. A computer-implemented method of maintaining software instances of a software program in a computing environment, the computer-implemented method comprising:

receiving an updating request for an updating process of a plurality of software instances from an old level to a new level;

attempting to update each software instance of the plurality of software instances to the new level according to at least one updating policy; and based on a failure of the updating of a failed instance of the plurality of software instances:

searching for an exchanging instance among other software instances according to at least one searching policy, the exchanging instance being adapted to be exchanged with the failed instance for continuing the updating process according to at least one optimization criterion of the computing environment;

exchanging the failed instance and the exchanging instance based on a positive result of the searching; and resuming the updating process corresponding to the failed instance;

wherein the searching for the exchanging instance comprises:

broadcasting an exchanging request to each one of the other software instances;

receiving a positive response to the exchanging request from one or more software instances of the other software instances being adapted to be exchanged with the failed instance, the exchanging instance being selected among the one or more software instances for which the positive response has been received, and for each software instance of the one or more software instances, the method further comprises:

receiving the exchanging request for the failed instance;

verifying whether the software instance is adapted to be exchanged with the corresponding failed instance based on the exchanging request; and returning the positive response to the exchanging request when the software instance is adapted to be exchanged with the corresponding failed instance.

2. The computer-implemented method according to claim 1, wherein each software instance of the plurality of software instances has at least one of a plurality of roles and wherein one or more of said at least one updating policy or said at least one optimization criterion depend on the roles of the plurality of software instances.

3. The computer-implemented method according to claim 2, wherein said at least one optimization criterion comprises an optimization criterion for maximizing an optimization value depending on a number of the plurality of software instances having at least a selected one of the roles, at the new level.

4. The computer-implemented method according to claim 2, wherein the plurality of roles comprises a primary role for each software instance being operative and a secondary role for each software instance being a back-up of one or more associated software instances having the primary role.

5. The computer-implemented method according to claim 1, wherein the exchanging instance is at the old level, said wherein the resuming the updating process corresponding to the failed instance comprises:

attempting to update the exchanging instance to the new level.

6. The computer-implemented method according to claim 1, wherein the exchanging instance is at the new level, and wherein the resuming the updating process corresponding to the failed instance comprises:

enabling the updating to the new level of at least a next one of the software instances being conditioned on the updating of the failed instance.

7. A computer-implemented method of maintaining software instances of a software program in a computing environment, the computer-implemented method comprising:

receiving an updating request for an updating process of a plurality of software instances from an old level to a new level;

attempting to update each software instance of the plurality of software instances to the new level according to at least one updating policy; and based on a failure of the updating of a failed instance of the plurality of software instances:

searching for an exchanging instance among other software instances according to at least one searching policy, the exchanging instance being adapted to be exchanged with the failed instance for continuing the updating process according to at least one optimization criterion of the computing environment;

exchanging the failed instance and the exchanging instance based on a positive result of the searching; and resuming the updating process corresponding to the failed instance;

wherein the failed instance remains failed at an end of the updating process, and wherein the computer-implemented method further comprises:

receiving an expanding request for expanding the searching;

further searching for a further exchanging instance adapted to be exchanged with the failed instance for continuing the updating process according to at least one expanding policy expanding the searching policy;

exchanging the failed instance and the further exchanging instance based on a positive result of the further searching; and resuming the updating process corresponding to the failed instance.

8. The computer-implemented method according to claim 7, wherein said at least one expanding policy comprises an expanding policy for searching for the further exchanging instance in at least one further computing environment comprising a plurality of further instances of said software program.

9. The computer-implemented method according to claim 7, wherein said at least one updating policy comprises at least one global updating policy, said at least one searching policy comprises at least one global searching policy, and said at least one expanding policy comprises at least one global expanding policy for software instances of the computing environment.

10. The computer-implemented method according to claim 9, wherein the plurality of software instances are partitioned into a plurality of instance groups each one comprising at least one of the plurality of software instances, said at least one updating policy comprising at least one local updating policy, said at least one searching policy comprising at least one local searching policy, and said at least one expanding policy comprising at least one local expanding policy for each instance group superseding said at least one global updating policy, said at least one global searching policy and said at least one global expanding policy, respectively.

11. The computer-implemented method according to claim 1, wherein each software instance is provided according to a software as a service model in a cloud environment.

* * * * *